United States Patent
Waitkus, Jr.

(10) Patent No.: US 7,957,937 B2
(45) Date of Patent: Jun. 7, 2011

(54) SYSTEMS AND METHODS FOR MATERIAL MANAGEMENT

(75) Inventor: Richard E. Waitkus, Jr., Houston, TX (US)

(73) Assignee: WM Trash Monitor Plus, LLC, Houston, TX (US)

(*) Notice: Subject to any disclaimer, the term of this patent is extended or adjusted under 35 U.S.C. 154(b) by 390 days.

(21) Appl. No.: 12/180,530

(22) Filed: Jul. 26, 2008

(65) Prior Publication Data
US 2009/0055239 A1 Feb. 26, 2009

Related U.S. Application Data

(63) Continuation of application No. 10/774,240, filed on Feb. 6, 2004, now Pat. No. 7,406,402.

(60) Provisional application No. 60/445,498, filed on Feb. 6, 2003, provisional application No. 60/445,720, filed on Feb. 6, 2003.

(51) Int. Cl.
*G06Q 10/00* (2006.01)

(52) U.S. Cl. ............................................... 702/188
(58) Field of Classification Search .................. 702/188
See application file for complete search history.

(56) References Cited

U.S. PATENT DOCUMENTS
5,967,028 A * 10/1999 Schomisch et al. ............ 100/35
* cited by examiner

*Primary Examiner* — Tung S Lau
(74) *Attorney, Agent, or Firm* — Greenberg Traurig, LLP

(57) ABSTRACT

A system and method are provided for scheduling the emptying or replacement of a waste container based on the fullness of the container or the usage of the container. These factors may be considered to determine when the waste container will become completely full. Additionally, the system and method may consider the customer preferences or the limitations of the waste hauler. All of these factors may be considered to determine an optimal time for the waste container to be emptied or replaced. These factors are also considered to determine when to accomplish the scheduling (i.e. when to notify the waste hauler that the waste container should be emptied or replaced at a given time).

18 Claims, 4 Drawing Sheets

SYSTEMS AND METHODS FOR MATERIAL MANAGEMENT

CROSS-REFERENCE TO RELATED APPLICATION

This application is a continuation of U.S. patent application Ser. No. 10/774,240 entitled "Systems and Method for Material Management," by Rick Waitkus, filed Feb. 6, 2004, now U.S. Pat. No. 7,406,402 which, in turn, claims priority to U.S. provisional patent application Ser. No. 60/445,498, filed Feb. 6, 2003, entitled "Determining an Optimal Pick-Up Time of a Waste Container," by Rick Waitkus and U.S. provisional patent application Ser. No. 60/445,720, filed Feb. 6, 2003, entitled "Weighing Baled Material," by Rick Waitkus.

BACKGROUND OF THE INVENTION TECHNOLOGY

1. Field of the Invention

The present invention is related to a scheduling system. More specifically, the present invention relates to a scheduling system for emptying or replacing waste containers.

2. Description of the Related Art

Waste units have been able to measure their own fullness and report that measurement to a central unit for a number of years. Furthermore, systems exist which predict when a waste unit will be completely full.

SUMMARY OF THE INVENTION

According to the present invention a method of scheduling the emptying or replacement of a waste container is provided. The method includes determining the fullness of the waste container where the material in the waste container is compacted by a compactor with a ram plate. Based on the measured fullness a projected full time is determined when the waste container will be totally full. The projected full time may be based on a usage pattern of the waste unit 1. An optimal time is determined for the waste hauler to empty or replace the waste container based on the projected full time, the customer's preferences, and the limitations of the waste hauler. A latest time when the emptying or replacement of the waste container may be scheduled is determined based on the optimal time, waste hauler limitations, or usage patterns.

In an example of the invention, the customer preferences include a preference that the waste container should never be entirely full or that the waste container should not be emptied or replaced at a particular time of day. In another example of the invention the limitations of the waste hauler include a limited number of trucks and drivers available to empty or replace the waste container at a given time or the limited hours available for the waste hauler to receive the request to empty or replace the waste container. In another example, the customer usage pattern is an average daily usage of the waste container.

Figure 1:
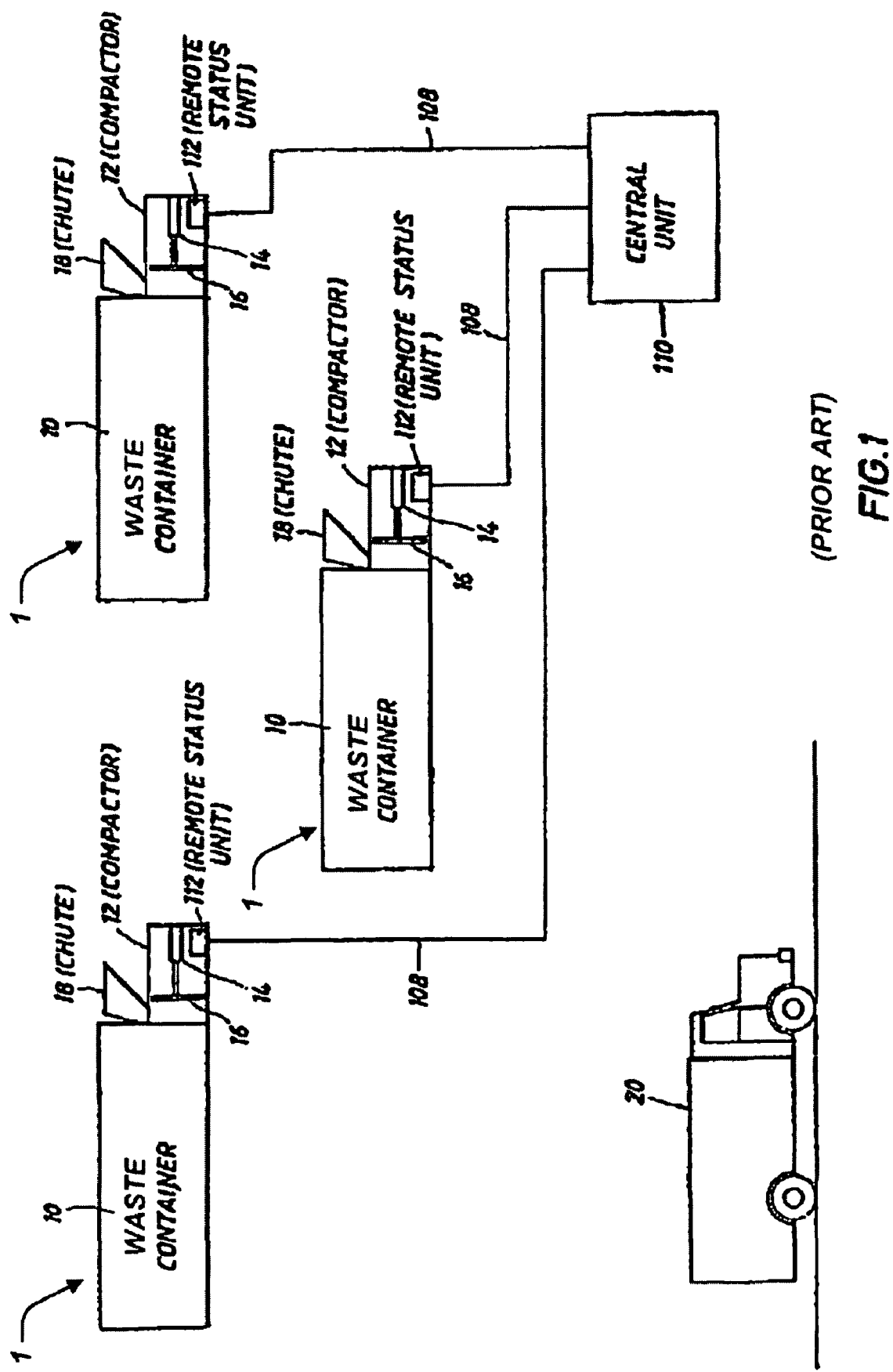
FIG. 1 is a diagram of a plurality of waste units connected to a central unit.

The present invention may be susceptible to various modifications and alternative forms. Specific examples of the present invention are shown by way of example in the drawings and are described herein in detail. It should be understood, however, that the description set forth herein of specific examples is not intended to limit the present invention to the particular forms disclosed. Rather, all modifications, alternatives and equivalents falling within the spirit and scope of the invention, as defined by the appended claims, are to be covered.

DETAILED DESCRIPTION

The present invention is directed to a system and method for determining the optimal time to empty or replace a waste container 10.

FIG. 1 shows a waste unit 1 including the waste container 10, a chute 18, a compactor 12, a ram plate 16, and a remote status unit 112. The remote status unit 112 is in communication with the central unit 110. The system may perform a calculation of a fullness of the waste container 10 each time the material in the waste container 10 is compacted. The system may also perform the calculation of the fullness of the waste container 10 at some other time. For example, it may make periodic (e.g., hourly) calculations of the fullness of the waste container. The system may then account for usage patterns, customer preferences, and waste hauler limitations to determine the optimal time for a waste hauler to empty or replace the waste container 10.

Figure 2:
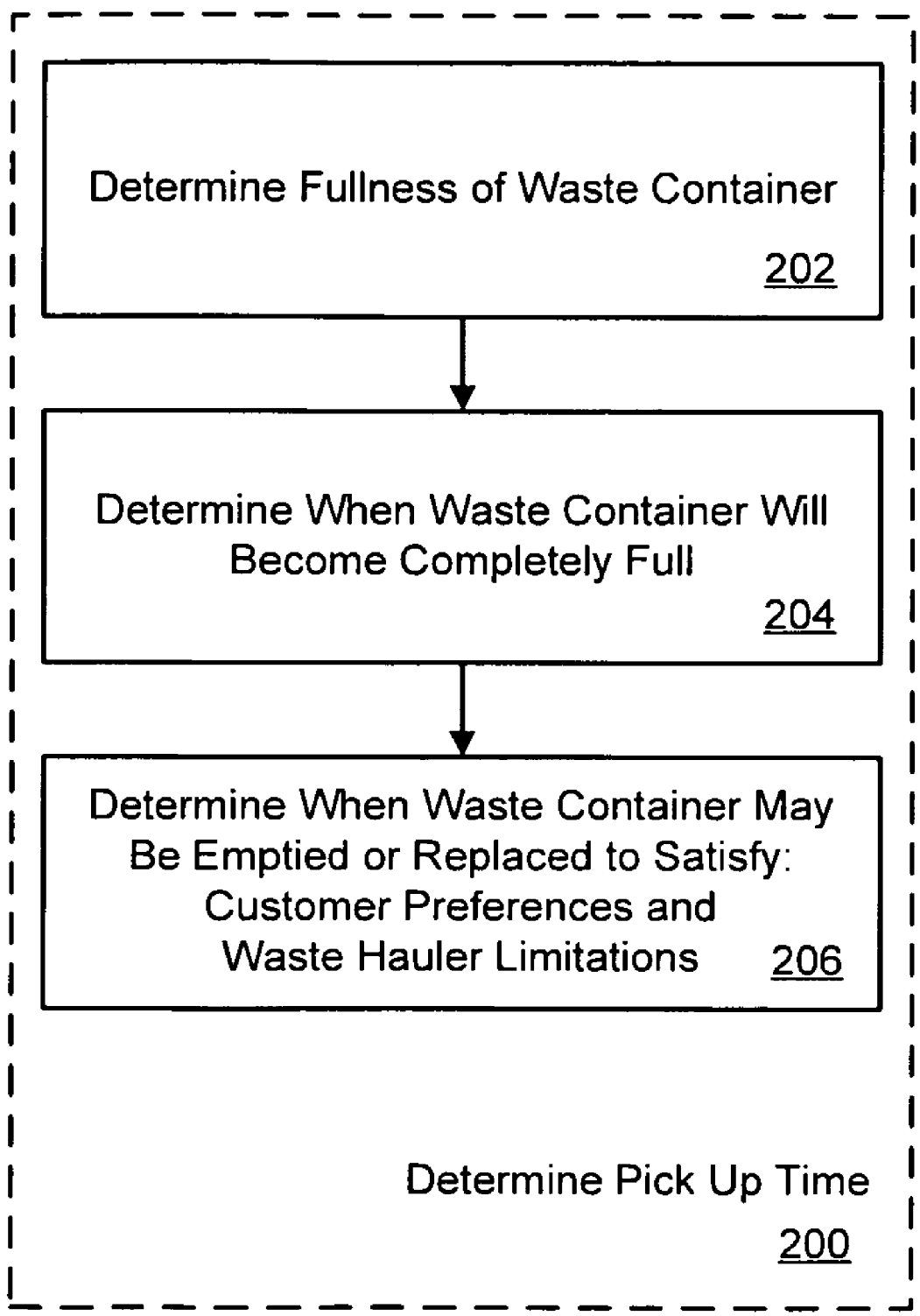
FIGS. 2-4 are flow charts of examples of the system.

FIG. 2 shows a system that performs a process 200 for determining a pick up time of a waste container 10 (block 200). The system determines the fullness of the waste container 10 (block 202). The system determines when the waste container 10 will become completely full (block 204). The system determines when the waste container 10 may be emptied or replaced to satisfy customer preferences and waste hauler limitations (block 206).

Figure 3:
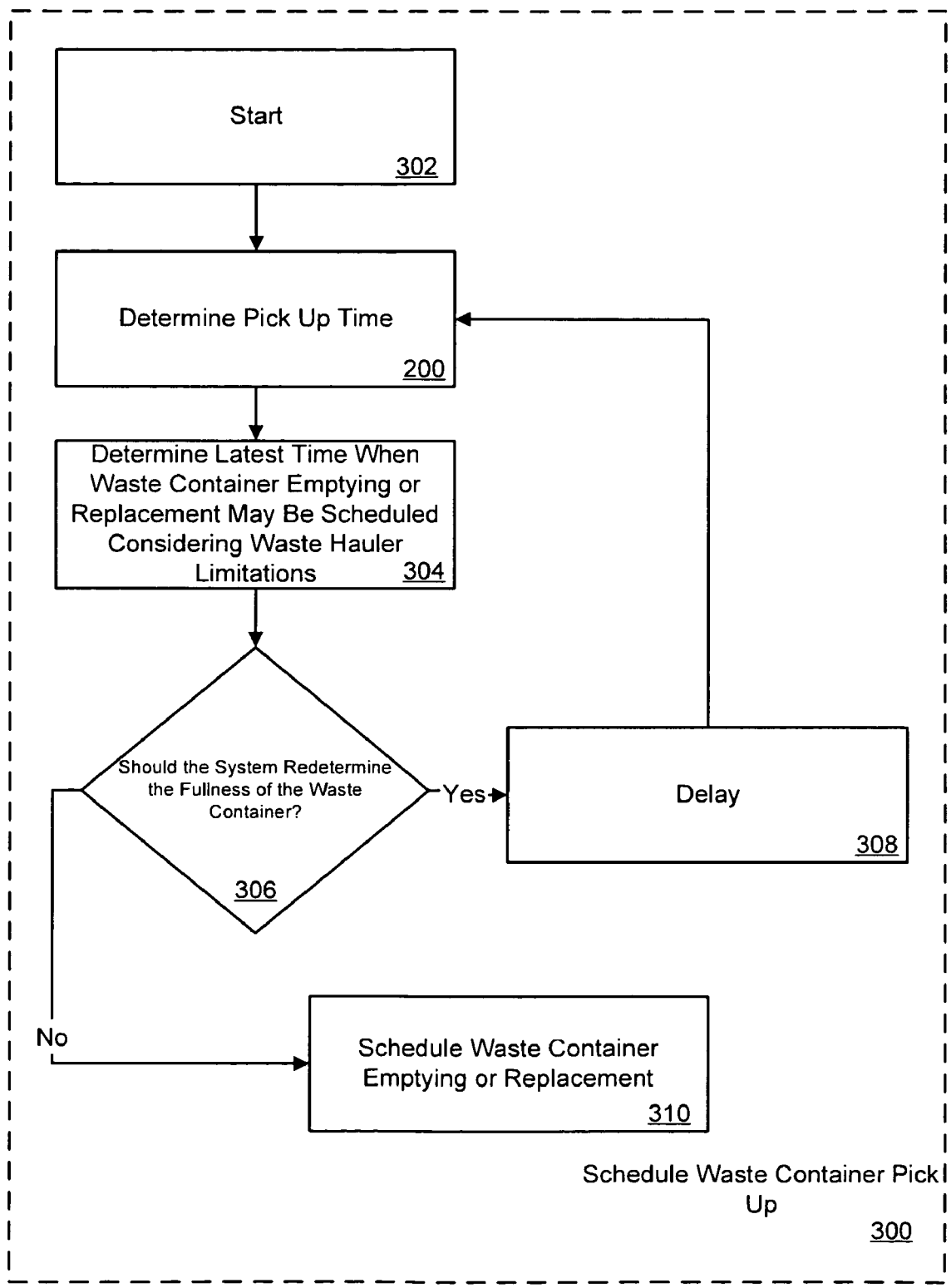

The system performs a process 300 for scheduling the pick up of waste container 10 (block 300), as shown in FIG. 3. The system starts the process 300 (block 302). The system performs the process 200 (block 200) as described with respect to FIG. 2. The system determines a latest time when waste container 10 may be scheduled for emptying or replacement (block 304). The system determines if it should redetermine the fullness of the waste container (block 306). If the fullness of the waste container should be redetermined, the system delays for some period of time (block 308) and again performs process 200 (block 200). If the fullness of the waste container 10 should not be redetermined, the system schedules waste container 10 for emptying or replacement (block 310).

Figure 4:
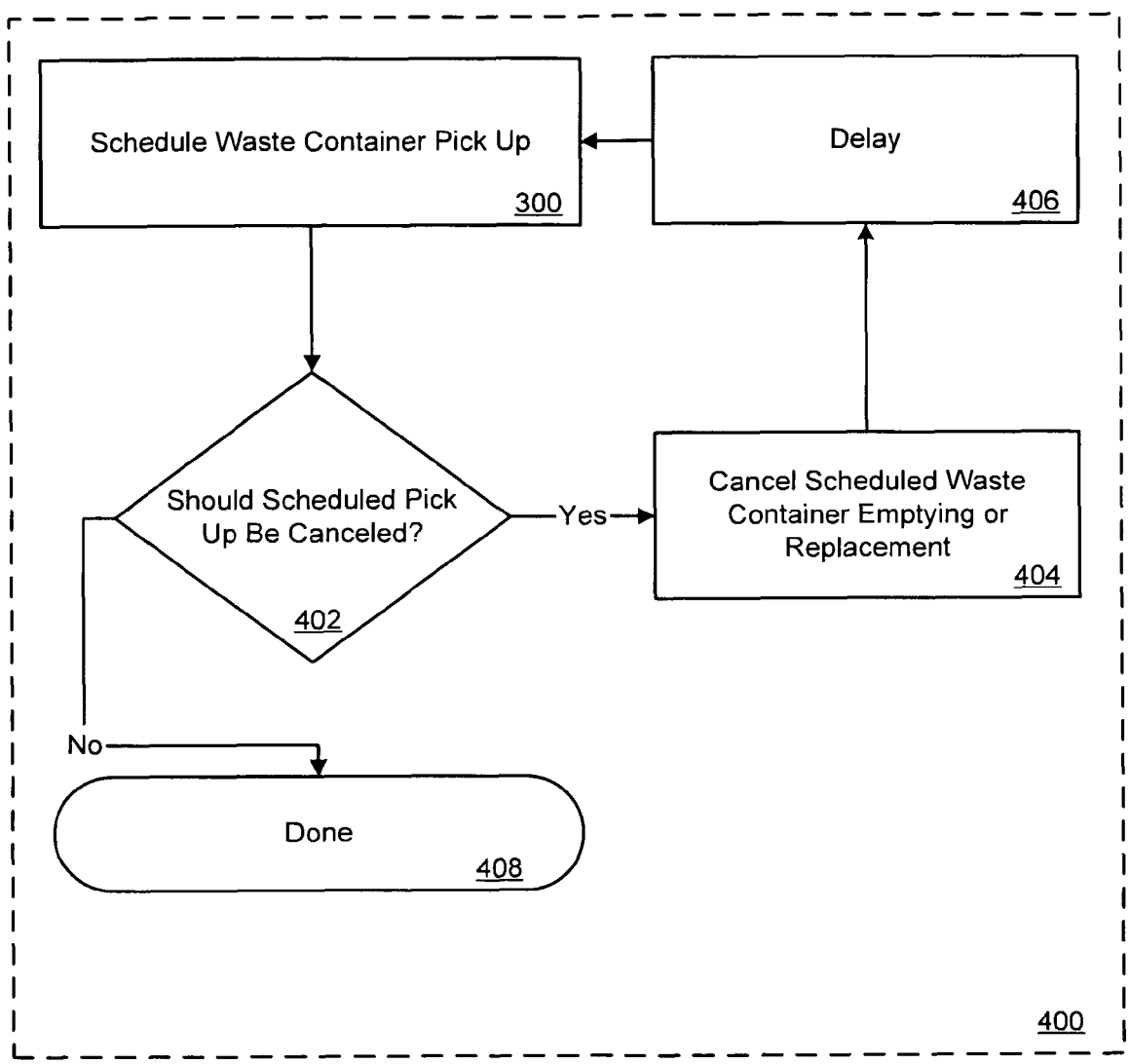

The system performs a process 400 for scheduling the emptying or replacement of waste container 10 (block 400), as shown in FIG. 4. The system performs the process 300 (block 300) as described with respect to FIG. 3. The system determines if the scheduled time for the emptying or replacement of waste container 10 should be canceled (block 402). If the scheduled time for the emptying or replacement of waste container 10 should be canceled, the system cancels the scheduled time for emptying or replacing the waste container 10 (block 404), delays for some period of time (block 406), and again performs process 300 (block 300). If the scheduled time for the emptying or replacement of waste container 10 should not be canceled, the system completes the process 400 (block 406).

Current Fullness

In one example of the present invention the remote status unit 112 determines the fullness of the waste container 10 while compacting the contents of the waste container 10. The fullness of the waste container 10 may be calculated, for example, by measuring the force exerted by the ram plate 16 while it is compacting the material in the waste container 10.

Based on the measured force the remote status unit 112 or central unit 110 may calculate the fullness of the waste container 10. For example, a pressure transducer may be placed between an arm of compactor 12 and the ram plate 16. Based on the pressure measured while compacting the material in waste container 10, the fullness of the waste container 10 may be determined.

In another example, the electrical current flowing through an actuator or motor on compactor 12 is measured while compactor 12 is compacting the material in the waste container 10. Based on the measured current, the fullness of the waste container 10 is calculated.

Usage Patterns

In another example, the system accounts for the usage patterns of the waste unit 1. The remote status unit 112 or the central unit 110 may calculate an average usage of the waste unit 1 for some periods of time. For example, the remote status unit 112 or the central unit 110 may collect data on the average number of compactions for the waste unit 1 for each day of the week, each day of the month, or some other relevant time period to determine when the waste container 10 will become full. To increase accuracy, the remote status unit 112 or the central unit 110 may also determine if the usage is trending upward or downward.

Predicting Fullness

In an example, the system determines a projected full time when the waste container will next become completely full. The system may determine a projected full time for the waste container 10 when the waste container 10 will become completely full based on the usage patterns of the waste unit 1. For example, the system may use linear regression to determine the projected full time for the waste container 10. The system may determine a projected full time when the waste container 10 will next become full based on the fullness of the waste container 10. In an example, the system may determine the projected full time based on both the fullness of the waste container 10 and the usage patterns of the waste unit 1.

In another example, the system may use the fullness of the waste container 10 or the usage patterns of the waste unit 1 to determine when the waste container 10 will reach some percentage of fullness. For example, the system may determine when the waste container 10 is fifty percent full.

Customer Preferences

In one example of the present invention, the system accounts for the customer preferences. For example, some customers may only want to have their waste container 10 emptied or replaced between certain hours (e.g., 8 AM to 5 PM) or on certain days (e.g., weekdays). Additionally, some customers may desire to always have their waste container 10 emptied or replaced before it is full, while other customers may have a threshold amount of time they can wait for their waste container to be emptied or for a new waste container 10 after their current waste container 10 is full. Therefore, the system will evaluate the projected full time and the customer preferences to determine when the waste container 10 should be emptied or replaced. In one example, the system may determine an optimal time when the waste container may be emptied in order to satisfy the customer preferences.

The customer preferences information may be stored in the central unit 110 or in the remote status unit 112 or where the scheduling system is implemented. For example, the information may be stored in a relational database or another conventional form of data storage. The information may be gathered directly from the user at waste unit 1, or may be input by the waste hauler at the central unit 110 or the waste hauler may provide this information remotely.

Waste Hauler Limitations

In another example, the system accounts for the limitations of the waste hauler. For example, the system may consider the number of available drivers and trucks at the present time or at some point in the future. The system may also consider the shift structure of the waste hauler. The system may also consider the number of hours a driver has driven in a period of time to insure that the drivers do not exceed any legal limit. The system may also consider the hours when waste hauler dispatch operations take requests for waste containers 10 to be emptied or replaced. The system may also consider the lead time required for the waste hauler to ready a replacement container and bring it to the customer. The system may also consider a lead time necessary to schedule a driver or truck. The system may also consider the operating hours of a material receiving site (e.g., landfill), or the material receiving site's ability to accept the material in the waste container 10. The system may also consider the operating hours of the company that is scheduling the waste hauler's operations.

In one example, the system may determine an optimal time when the waste container may be emptied in order to satisfy the waste hauler limitations. In another example, the system may determines the optimal time when the waste container 10 may be emptied in order to satisfy both the customer preferences and the waste hauler limitations.

The information regarding the limitations of the waste hauler may be stored in the central unit 110 or in the remote status unit 112. For example, the information may be stored in a relational database or another conventional form of data storage. The information may be gathered directly from the waste hauler and stored at the central unit 110 or where the scheduling system is located.

Communication and Scheduling

In an example system, the remote status unit 112 communicates with the central unit 110. The waste unit 1 may send information about the fullness of the waste container 10 or other information about the waste unit. Waste unit 1 may also allow the user of the waste unit to manually signal the central unit 110 that the waste container 10 should be emptied or replaced.

In an example system, all of the information about the customer preferences, limitations of the waste hauler, and current fullness of the waste container 10 is stored in the remote status unit 112. When the remote status unit 112 determines that it should request that waste container 10 be emptied or replaced in order to satisfy customer preferences or waste hauler limitations, remote status unit 112 contacts the central unit 110 to notify the central unit 110 that a waste truck 20 should be scheduled to empty or replace the waste container 10 at a time that satisfies both the customer preferences and the waste hauler limitations.

In another example system, information about the customer preferences and limitations of the waste hauler are stored in central unit 110 or in a unit accessible by central unit 110. The central unit 110 communicates with the remote status unit 112, for example, on a periodic basis, to receive the fullness of the waste container 10. Alternatively, every time the waste in waste container 10 is compacted, the remote status unit 112 may contact the central unit 110 and communicate the fullness to central unit 110. The central unit 110 may store the fullness of waste container 10 in a database. When the central unit 110 determines that waste container 10 should be emptied or replaced at a certain time in order to satisfy customer preferences or waste hauler limitations, the central unit schedules a waste truck 20 to empty or replace the waste container 10.

In another example system, information about the customer preferences and limitations of the waste hauler are stored in central unit 110 or in a unit accessible by central unit 110. The central unit 110 communicates with the remote status unit 112, for example, on a periodic basis, to collect the fullness of the waste container 10. Alternatively, every time the waste in waste container 10 is compacted, the remote status unit 112 may contact the central unit 110 and communicate the fullness to central unit 110. The central unit 110 may store the fullness of waste container 10 in a database. The central unit 110 determines the latest time that the system should request that the waste container 10 be emptied or replaced in order to satisfy customer preferences or waste hauler limitations. Some time before the latest time, the central unit 110 communicates with the remote status unit 112 to collect the fullness of the waste container 10. For example, the central unit 110 may communicate with the remote status unit 112 thirty minutes before the latest time. The system may update the projected full time for waste container 10 based on the received fullness of the waste container 10. The system may update the latest time opportunity 10 based on the received fullness of the waste container 10. The system may be schedule that waste container 10 to be emptied or replaced at a certain time in order to satisfy customer preferences or waste hauler limitations, the central unit schedules a waste truck 20 to empty or replace the waste container 10.

In an example of the system, an operator at the central unit 110 has a display of the latest times that the systems for waste containers $10_{1...N}$ should request that each of the waste containers $10_{1...N}$ be emptied or replaced in order to satisfy customer preferences or waste hauler limitations. Before the latest time that the system should request that the waste container 10 be emptied or replaced in order to satisfy customer preferences or waste hauler limitations, the operator causes the central unit 110 to communicate with the remote status unit 112 to determine the current fullness of waste container 10. The operator may cause the central unit 110 to communicate with the remote status unit 112 thirty minutes before the latest time that the system should request that the waste container 10 be emptied or replaced in order to satisfy customer preferences or waste hauler limitations. The operator may call, fax, or email the waste hauler to schedule the emptying or replacement of waste container 10. The operator may not schedule the emptying or replacement of waste container 10 if the latest time that the system should request that the waste container 10 be emptied or replaced in order to satisfy customer preferences or waste hauler limitations lapses into a later time or a later day.

The invention may also notify the central unit when the waste unit 1 is malfunctioning or broken. For example, the user of waste unit 1 may press a button to manually signal that the waste unit 1 is malfunctioning. In another example, the remote status unit will recognize that compactor 12 is malfunctioning from measurements that are made (e.g. actuator current or ram pressure) and automatically communicate to central unit 110 that the waste unit 1 is broken.

While the invention has been depicted, described and is defined by reference to specific examples, such references do not imply a limitation on the invention, and no such limitation is to be inferred. The invention is capable of considerable modification, alteration and equivalents in form and function, as will occur to those of ordinary skill in the pertinent arts and having the benefit of this disclosure. The depicted and described embodiments of the invention are exemplary only, and are not exhaustive of the scope of the invention. Consequently, the invention is to be limited only by the spirit and scope of the appended claims, giving full cognizance to equivalents in all respects.

What is claimed is:

1. A material management system including: one or more waste containers adapted to receive and compact waste; a fullness-measuring subsystem for determining the fullness of one or more waste containers; a computerized scheduling subsystem in communication with the fullness-measuring subsystem for automatically determining an optimal time to empty each waste container, based one or more scheduling factors including the fullnesses of the waste container and scheduling factors related to predicted future usage, where the predicted future usage is based on statistical analysis, performed by the computerized scheduling sub-system, of customer usage patterns including prior recorded fullnesses, and where the statistical analysis, performed by the computerized scheduling sub-system, of customer usage patterns includes linear regression.

2. The material management system of claim 1, where the scheduling factors related to the predicting future usage include customer preferences and waste hauler limitations.

3. The material management system of claim 1, including a communication subsystem in communication with the computerized scheduling subsystem for notifying the waste hauler when to remove the waste container.

4. The material management system of claim 1, where the computerized scheduling system is subject to user-intervention.

5. The material management system of claim 1, where the computerized scheduling subsystem, for each waste container: causes the fullness-measuring subsystem to determine again the fullness of the waste container and the optimal pickup time, a lead time before scheduling the waste container removal; and if the optimal removal time has changed, determining again when to accomplish the scheduling of the waste container removal.

6. The material management system of claim 1, where the computerized scheduling subsystem, for each waste container: determines when to accomplish the scheduling of the waste container removal, based on the optimal time and one or more waste hauler limitations.

7. The material management system of claim 2, where the optimal time is the latest time that satisfies customer preferences and waste hauler limitations.

8. The material management system of claim 2, where the customer preferences considered by the computerized scheduling sub-system include one or more preferences selected from the group consisting of: a preference that the customer's waste container only reach a certain level of fullness; a preference that the customer's waste container not be emptied on certain days of the week; and a preference that the customer's waste container not be emptied during certain hours of the day.

9. The material management system of claim 2, where the waste hauler limitations considered by the computerized scheduling sub-system include one or more limitations selected from the group consisting of: a number of drivers available at a specified time; a number of trucks available at a specified time; a distance from the waste hauler to the customer's waste container; a distance from the customer's waste container to the material receiving site; operating hours of the waste hauler's dispatcher/routing office; and operating hours of a company that schedules hauls with the waste hauler.

10. The material management system of claim 4, where the user-intervention includes a user determining when to schedule the removal of a waste container.

11. The material management system of claim 7, where, if no time satisfies customer preferences and waste hauler limitations, the computerized scheduling system will choose an optimal time that satisfies one or more customer preferences.

12. The material management system of claim 7, where, if no time satisfies customer preferences and waste hauler limitations, the computerized scheduling system will choose an optimal time that satisfies one or more waste hauler limitations.

13. A computerized method for scheduling a pick up time to remove of one or more waste containers, including, for each waste container:
    automatically determining a fullness of the waste container;
    automatically determining when a waste container will reach a target level of fullness, based on the current fullness and predicted future usage, where the predicted future usage is based on statistical analysis of customer usage patterns including prior recorded fullnesses, and where the statistical analysis of customer usage patterns includes linear regression;
    automatically determining an optimal time to remove the waste container, based on when the waste container will reach a target level of fullness, customer preferences, and waste hauler limitations; and
    automatically scheduling the removal of the waste container for the optimal time.

14. The method of claim 13, where the target level of fullness is some percentage of fullness.

15. The method of claim 13, including, for each waste container:
    automatically determining when to accomplish the scheduling of the waste container removal, based on the optimal time and one or more waste hauler limitations.

16. The method of claim 14, where the percentage of fullness is about 100%.

17. The method of claim 15, where automatically determining when to accomplish the scheduling includes: determining the latest time to accomplish the scheduling.

18. A non-transitory computer storage medium containing computer instructions stored therein for causing a computer processor to perform, for use in scheduling a pick up time to remove one or more waste containers, the computer instructions causing the computer processor to, for each waste container:
    determine a fullness of the waste container;
    determine when the waste container will reach a target level of fullness, based on the current fullness and predicted future usage, where the predicted future usage is based on statistical analysis of customer usage patterns including prior recorded fullnesses, and where the statistical analysis of customer usage patterns includes linear regression;
    determine an optimal time to remove the waste container, based on the predicted full time, customer preferences, and waste hauler limitations; and
    schedule the removal of the waste container for the optimal time.

* * * * *